(12) United States Patent
Morita

(10) Patent No.: US 11,523,023 B2
(45) Date of Patent: Dec. 6, 2022

(54) TRANSMITTING APPARATUS HAVING TRANSMISSION REPORT OUTPUT, METHOD FOR CONTROLLING THE TRANSMITTING APPARATUS, AND COMPUTER-READABLE STORAGE MEDIUM

(71) Applicant: CANON KABUSHIKI KAISHA, Tokyo (JP)

(72) Inventor: Hiroyasu Morita, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/149,993

(22) Filed: Jan. 15, 2021

(65) Prior Publication Data

US 2021/0136248 A1 May 6, 2021

Related U.S. Application Data

(63) Continuation of application No. 16/402,298, filed on May 3, 2019, now Pat. No. 10,924,628, which is a
(Continued)

(30) Foreign Application Priority Data

Mar. 25, 2014 (JP) ................................ 2014-062727

(51) Int. Cl.
*H04N 1/32* (2006.01)
*H04N 1/00* (2006.01)
*G06F 3/12* (2006.01)

(52) U.S. Cl.
CPC ....... *H04N 1/32117* (2013.01); *G06F 3/1203* (2013.01); *G06F 3/1268* (2013.01);
(Continued)

(58) Field of Classification Search
CPC .......... H04N 1/32117; H04N 1/00214; H04N 2201/3202; H04N 2201/0094
See application file for complete search history.

(56) References Cited

U.S. PATENT DOCUMENTS 5,818,606 A 10/1998 Muramatsu et al.
6,823,367 B1 * 11/2004 Wakasugi .............. G06Q 30/06
358/402
(Continued)

FOREIGN PATENT DOCUMENTS

CN 1310404 A 8/2001
CN 101206557 A 6/2008
(Continued)

OTHER PUBLICATIONS

Japanese Office Action dated Feb. 22, 2021, in related Japanese Patent Application No. 2019-234649.
(Continued)

*Primary Examiner* — Nicholas Pachol
(74) *Attorney, Agent, or Firm* — Venable LLP

(57) ABSTRACT

A transmitting apparatus includes a communication interface that transmits data according to a transmission job, and a controller having one or more processors which executes instructions stored in one or more memories. The controller is configured to set a setting of outputting of a transmission report indicating a transmission result of the transmission job as a device setting of the apparatus, set the setting of outputting of the transmission report as a setting of the transmission job, and set whether or not to accept the setting of outputting of the transmission report of the transmission job as the device setting of the apparatus.

13 Claims, 12 Drawing Sheets

Related U.S. Application Data continuation of application No. 15/398,993, filed on Jan. 5, 2017, now Pat. No. 10,321,010, which is a continuation of application No. 14/644,338, filed on Mar. 11, 2015, now Pat. No. 9,563,391.

(52) U.S. Cl.
CPC ....... H04N 1/0022 (2013.01); H04N 1/00214 (2013.01); H04N 1/32 (2013.01); H04N 1/32651 (2013.01); H04N 2201/0093 (2013.01); H04N 2201/0094 (2013.01); H04N 2201/3201 (2013.01); H04N 2201/3202 (2013.01); H04N 2201/3214 (2013.01); H04N 2201/3215 (2013.01); H04N 2201/3218 (2013.01); H04N 2201/3223 (2013.01)

(56) References Cited

U.S. PATENT DOCUMENTS

| | | |
|---|---|---|
| 7,221,469 B2 | 5/2007 | Morita |
| 8,035,828 B2 | 10/2011 | Furuya |
| 8,472,050 B2 | 6/2013 | Nishiyama |
| 8,549,021 B2 | 10/2013 | Ishikawa et al. |
| 8,612,521 B2 | 12/2013 | Tonegawa |
| 8,749,828 B2 | 6/2014 | Kanuma |
| 2005/0024687 A1* | 2/2005 | Hanafusa ........... H04N 1/32101 358/400 |
| 2005/0141044 A1 | 6/2005 | Morita |
| 2006/0017941 A1* | 1/2006 | Momozono ........ H04N 1/00411 358/1.1 |
| 2006/0288116 A1* | 12/2006 | Seki ...................... H04L 63/102 709/232 |
| 2007/0019231 A1* | 1/2007 | Maeshima ......... H04N 1/32117 358/1.15 |
| 2007/0071199 A1* | 3/2007 | Ozeki ................ H04N 1/00217 379/142.05 |
| 2007/0146806 A1 | 6/2007 | Ishihara |
| 2007/0258106 A1* | 11/2007 | Ishiyama ........... H04N 1/32112 358/1.15 |
| 2008/0007789 A1 | 1/2008 | La |
| 2008/0007791 A1 | 1/2008 | Nagarajan et al. |
| 2008/0117791 A1 | 5/2008 | Wang et al. |
| 2008/0134011 A1* | 6/2008 | Ogura .................. H04N 1/4406 715/200 |
| 2010/0110485 A1* | 5/2010 | Watariuchi ......... H04N 1/32411 358/1.15 |
| 2010/0238515 A1 | 9/2010 | Kanuma |
| 2011/0051189 A1* | 3/2011 | Suga ...................... H04N 1/346 358/1.15 |
| 2012/0154835 A1 | 6/2012 | Tonegawa |
| 2012/0154861 A1* | 6/2012 | Sato .................... H04N 1/32106 358/1.15 |
| 2012/0257234 A1* | 10/2012 | Kanuma ............ H04N 1/32112 358/1.13 |
| 2014/0063527 A1* | 3/2014 | Takagi ............... H04N 1/00925 358/1.13 |
| 2014/0067978 A1 | 3/2014 | Tonegawa |
| 2015/0124280 A1* | 5/2015 | Tachi .................... G06F 3/1285 358/1.14 |
| 2015/0124296 A1* | 5/2015 | Ogawa ............... H04N 1/32662 358/402 |
| 2017/0230529 A1* | 8/2017 | Tachi ................. H04N 1/32101 |

FOREIGN PATENT DOCUMENTS

| | | |
|---|---|---|
| CN | 101600040 A | 12/2009 |
| JP | H11-088582 A | 3/1999 |
| JP | 2002-314781 A | 10/2002 |
| JP | 2003-016692 A | 1/2003 |
| JP | 2003-046692 A | 2/2003 |
| JP | 2005-057395 A | 3/2005 |
| JP | 2006-048168 A | 2/2006 |
| JP | 2007-181095 A | 7/2007 |
| JP | 2008-141480 A | 6/2008 |
| JP | 2008-205921 A | 9/2008 |
| JP | 2009-020822 A | 1/2009 |
| JP | 2010-226304 A | 10/2010 |
| JP | 2012-222522 A | 11/2012 |

OTHER PUBLICATIONS

Chinese Office Action dated Mar. 1, 2021, in related Chinese Patent Application No. 201910858488.4.
Chinese Office Action dated Jun. 23, 2017, in related Chinese Patent Application No. 201510120921.6 (with English translation).
Japanese Office Action dated Nov. 17, 2017, in related Japanese Patent Application No. 2014-062727.
Chinese Office Action dated May 11, 2018, in corresponding Chinese Patent Application No. 201510120921.6 (with English translation).
Japanese Office Action dated Mar. 12, 2019, in related Japanese Patent Application No. 2018-100860.

* cited by examiner

F I G. 9
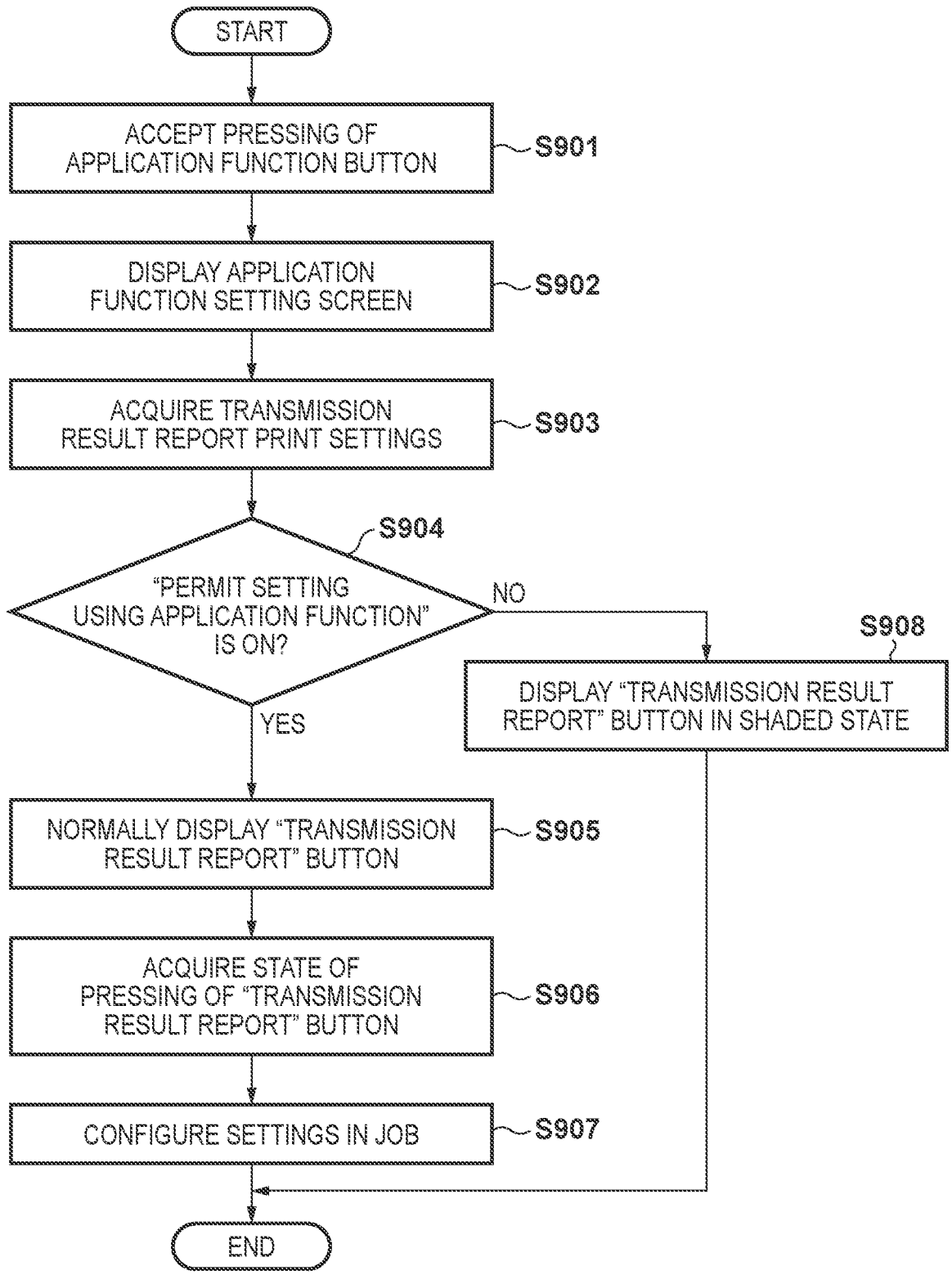

TRANSMITTING APPARATUS HAVING TRANSMISSION REPORT OUTPUT, METHOD FOR CONTROLLING THE TRANSMITTING APPARATUS, AND COMPUTER-READABLE STORAGE MEDIUM

This application is a continuation of application Ser. No. 16/402,298, filed May 3, 2019, which is a continuation of application Ser. No. 15/398,993, filed Jan. 5, 2017, now U.S. Pat. No. 10,321,010, issued Jun. 11, 2019, which is a continuation of application Ser. No. 14/644,338, filed Mar. 11, 2015, now U.S. Pat. No. 9,563,391, issued Feb. 7, 2017.

BACKGROUND OF THE INVENTION

Field of the Invention

The present invention relates to a transmitting apparatus, a method for controlling the transmitting apparatus, and a computer-readable storage medium.

Description of the Related Art

In recent years, multi-function printers have been widely used that include not only a copy function but also a print function, a fax function, a scan function, an address book for managing transmission address information, and the like, and that can execute a plurality of functions. Such a multi-function printer includes an operation unit having an operation panel provided with a touch panel and hard keys, and a user touches an icon or the like of a desired function in a function list displayed on the operation panel and designates the desired function. A user authentication function is also provided, and operations to the multi-function printer performed by an authenticated user are restricted in accordance with the authority of this user.

Conventionally, this kind of multi-function printer and facsimile apparatus include a transmission result report function of printing and outputting a result of transmission performed by a user using the fax function or a network scan function. With this transmission result report function, the user can set a desired operation, such as "always print", "never print", or "print only in case of error", and upon transmission ending, the apparatus controls printing of the transmission result report in accordance with this setting.

Meanwhile, there is a use case of printing and storing the transmission result report as evidence that an important document has been transmitted. However, in some cases, a setting of the printing of the transmission result report that is configured by an administrator or the like is different from a setting of the printing of the transmission result report that is intended by the user who is about to transmit an important document. For example, if the setting is not "always print", the transmission result report is not printed. For this reason, in order for the user to print the transmission result report, it is necessary to open a setting screen of the apparatus and check the setting of the transmission result report for each transmission job, and to change this setting as necessary. Furthermore, after the user changes the setting of the transmission result report and executes desired processing, this user needs to restore the setting of the transmission result report again via the setting screen. For this reason, it takes time and effort of the user, and if the user forgets to restore the setting, other users will be bothered.

With regard to this problem, Japanese Patent Laid-Open No. 2003-46692 describes a facsimile apparatus in which a setting of printing or not printing the transmission result report can be configured, and a setting screen is displayed for configuring a setting of printing or not printing the transmission result report upon a start key for giving a fax transmission instruction being pressed. With the technique described in Japanese Patent Laid-Open No. 2003-46692, the printing of the transmission result report is controlled in accordance with settings configured on the setting screen at the time when the start key is pressed.

With the technique described in aforementioned Japanese Patent Laid-Open No. 2003-46692, a setting of printing or not printing the transmission result report can be configured when the start key is pressed, and accordingly the operability is improved as compared with the case of opening the setting screen and configuring a transmission result report print setting every time the setting of a transmission job is configured.

However, there is a possibility that a problem will arise if whether or not to print the transmission result report is left to the intention of the user who operates the apparatus. That is to say, if the setting is changed by an operation of a general user so as not to print the transmission result report even though the administrator wants to always print the transmission result report, there is a possibility that a problem will arise in the management regarding security, information maintenance, or the like.

SUMMARY OF THE INVENTION

The present invention provides a technique for allowing coexistence of a report output setting that serves as a common setting for a plurality of transmission jobs and a report output setting that serves as an individual setting for a specific transmission job.

In order to achieve the above-stated object, a transmitting apparatus according to a mode of the present invention has the following configuration. That is to say, the present invention is: a transmitting apparatus including: an executing unit configured to execute a transmission job for transmitting image data; an outputting unit configured to output a report indicating a result of transmission of the image data; a first accepting unit configured to accept, as a common setting for a plurality of transmission jobs, a first instruction regarding output of the report; a second accepting unit configured to accept, as an individual setting for a specific transmission job, a second instruction regarding output of the report; and a control unit configured to perform control so as to output the report by using the outputting unit if the second instruction indicates that the report is to be output, even if the first instruction does not indicate that the report is to be output.

According to the present invention, a report output setting that serves as a common setting for a plurality of transmission jobs and a report output setting that serves as an individual setting for a specific transmission job are allowed to coexist.

Further features of the present invention will become apparent from the following description of exemplary embodiments (with reference to the attached drawings).

Note that, in the attached drawings, the same or similar configurations are given the same reference numerals.

BRIEF DESCRIPTION OF THE DRAWINGS

The attached drawings are included in the specification, constitute a part thereof, show embodiments of the present invention, and are used for illustrating the principle of the present invention in conjunction with the description of the specification.

FIG. 9 is a flowchart illustrating processing in the case of configuring a print setting of "transmission result report" on the application function setting screen in the multi-function printer according to Embodiment 1.

DESCRIPTION OF THE EMBODIMENTS

Embodiments of the present invention will be hereinafter described in detail, with reference to the attached drawings. Note that the following embodiments are not intended to limit the scope of the claims in the present invention, and not all combinations of features described in the embodiments are necessarily essential to the solving means of the present invention. Note that these embodiments will describe, as an example of a transmitting apparatus of the present invention, an exemplary multi-function printer having a scan function, a copy function, a print function, a storage function, and the like.

Figure 1:
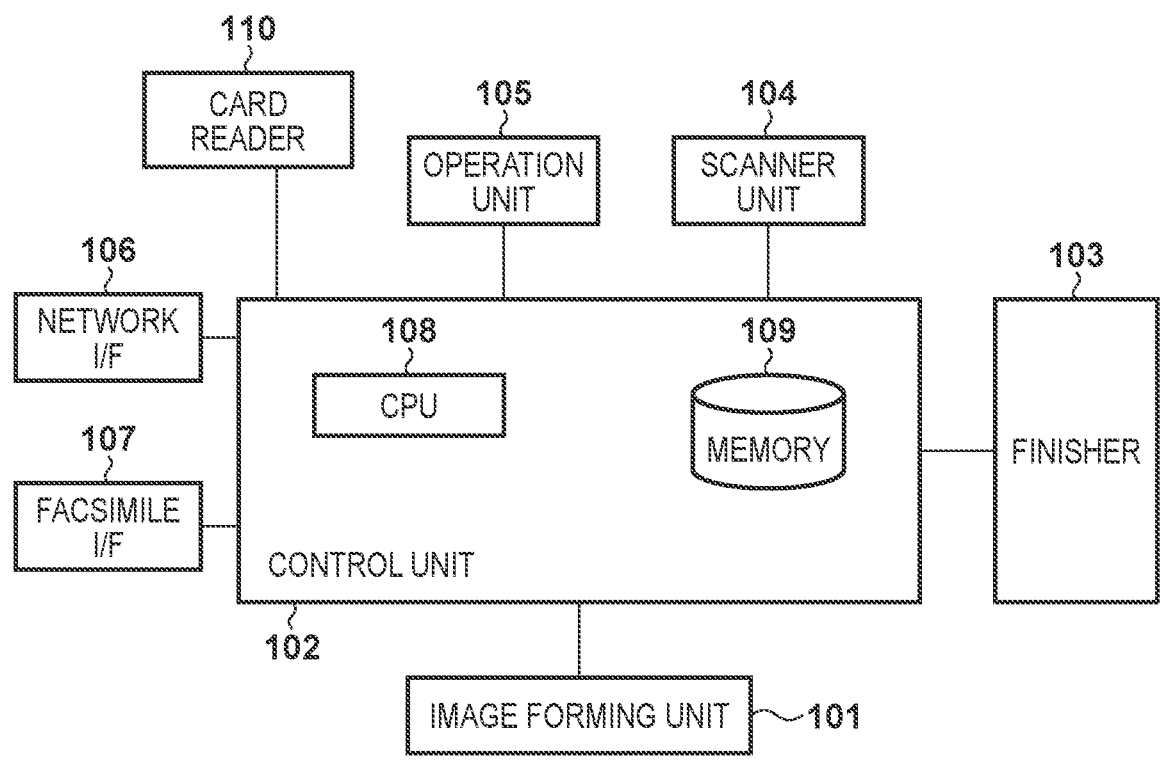
FIG. 1 is a block diagram showing a schematic configuration of a digital multi-function printer (copying machine).

FIG. 1 is a block diagram showing a schematic configuration of a digital multi-function printer (copying machine) according to the embodiments.

This digital copying machine includes an image forming unit 101 that forms an image on recording paper (sheet) using a method such as an electrophotographic method, and a control unit 102 that controls the digital copying machine. The digital copying machine also includes a finisher 103 that performs post-processing such as stapling processing, a scanner unit 104 that reads an original and outputs image data of the original, and an operation unit 105 that inputs various kinds of data and commands. The digital copying machine also includes a network interface (I/F) 106 that transmits and receives image data via a network, a facsimile interface 107 that transmits and receives fax data, and a card reader 110 that performs authentication of a user who uses this multi-function printer. The aforementioned image forming unit 101, finisher 103, scanner unit 104, operation unit 105, network I/F 106, facsimile I/F 107, and card reader 110 are connected to the control unit 102 via respective dedicated interfaces (not shown).

The control unit 102 is provided with a central processing unit (CPU) 108 and a storage apparatus (memory) 109. The memory 109 stores operation control programs or the like with which the CPU 108 executes processing following later-described flowcharts. The memory 109 also stores a control program for a setting dialog box, contents of description of screen information or the like, and so on. Here, the memory 109 includes storage units or the like, such as a DRAM that stores programs which are to be executed by the CPU 108 and provides a work area, and a HDD (hard disk drive) that stores programs, image data, and the like in a nonvolatile manner.

Figure 2:
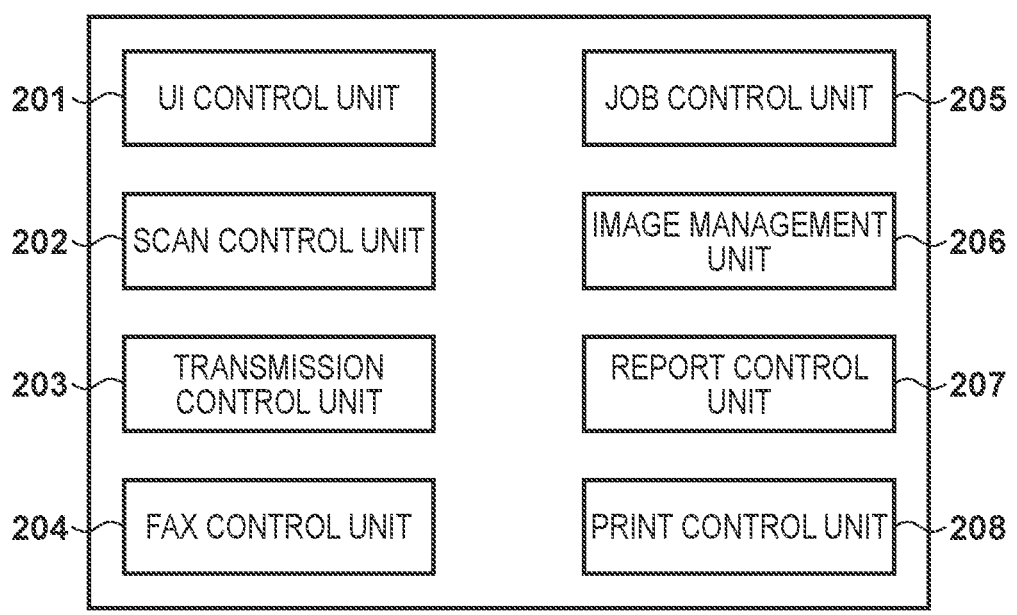
FIG. 2 is a block diagram illustrating software functions of the multi-function printer.

FIG. 2 is a block diagram illustrating software functions of the multi-function printer according to the embodiments.

A UI control unit 201 displays an operation screen on a display unit of the operation unit 105 and controls a user interface (UI) for accepting a user operation. A scan control unit 202 controls the scanner unit 104 and controls processing for reading an image of an original. A transmission control unit 203 controls processing for transmitting, to an address designated by the user using the network interface 106, the image data obtained from the scanner unit 104 by the scan control unit 202 controlling the scanner unit 104. A fax control unit 204 controls fax transmission and reception via the facsimile interface 107.

A job control unit 205 manages a transmission request from the user accepted by the UI control unit 201, as well as execution status and history thereof. An image management unit 206 manages image data acquired from the scanner unit 104. A report control unit 207 references job history that is managed by the job control unit 205 and generates the transmission result report. A print control unit 208 controls printing of image data acquired from the scanner unit 104, a received fax document, the transmission result report, or the like on a sheet, using the image forming unit 101. Programs that realize these software functions are stored in the memory 109, and these functions are executed as a result of the programs being executed under the control of the CPU 108.

Figure 3:
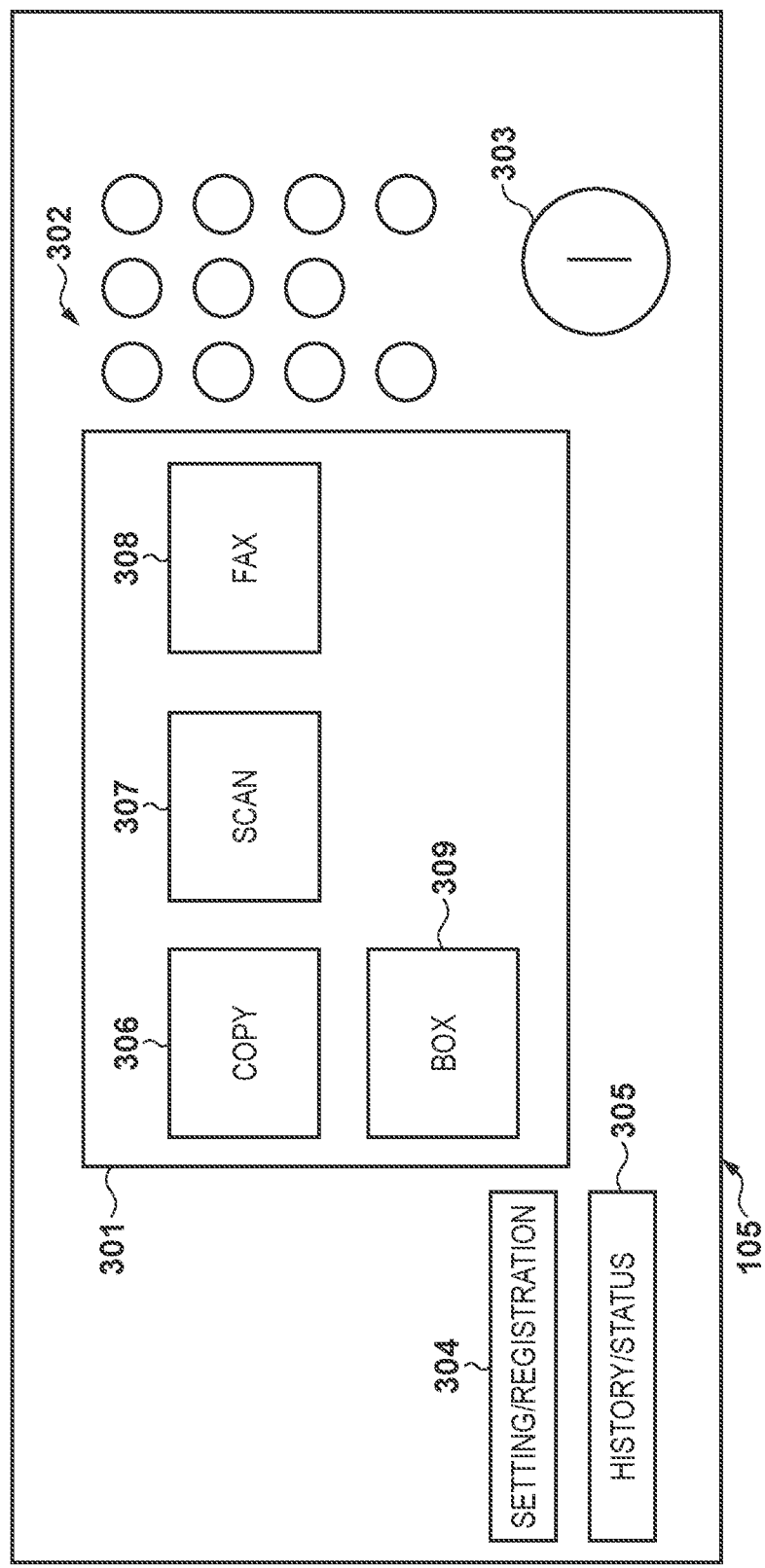
FIG. 3 is a diagram showing a state where a home screen is displayed on a display unit of an operation unit of the multi-function printer.

FIG. 3 is a diagram showing a state where an initial screen is displayed on a display unit 301 of the operation unit 105 of the multi-function printer according to the embodiments.

A copy button 306, a scan button 307, a fax button 308, and a box button 309 are displayed on the display unit 301. Upon the user selecting and touching any of these buttons, processing of the function corresponding to the button is started. Furthermore, this operation unit 105 includes a ten key 302 and a start key 303 for giving an instruction to start a job. Furthermore, a "setting/registration" button 304 that calls a device setting screen and a "history/status" button 305 that calls a job history/status screen are also arranged.

Figure 4A:
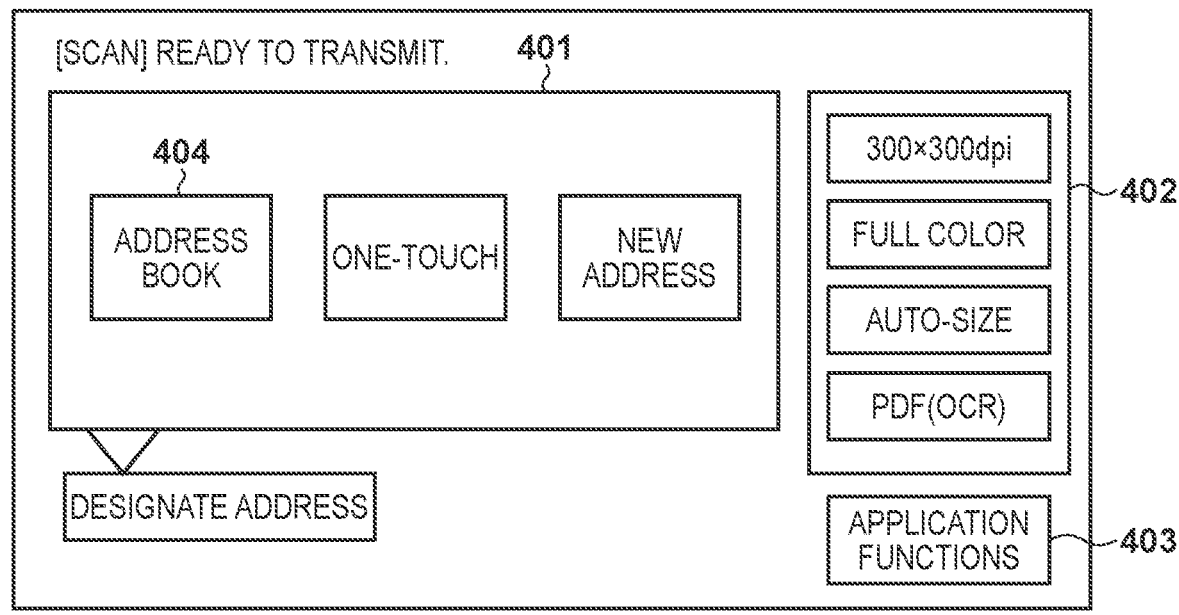
FIG. 4A is a diagram showing an exemplary scan operation screen.

FIG. 4A is a diagram showing an exemplary scan operation screen that is displayed on the display unit 301 of the operation unit 105 by the user pressing the "scan" button 307 on the screen in FIG. 3.

Buttons with which the user designates an address are displayed in an address input area 401. The designation of the address here can be executed by using any of "address book", "one-touch", and "new address". Upon the user pressing an address book button 404, an address book screen is displayed on the display unit 301. The user can thereby select a desired address from the address book. Upon the "one-touch" button being pressed, a screen of keys that are registered as one-touch keys is displayed, and the user selects a key corresponding to a desired address from among them. Upon the "new address" button being pressed, a screen for inputting an address is displayed, and the user inputs a telephone number or the like of the address by using a ten key 302 or the like.

A button group 402 includes transmission setting buttons for configuring transmission settings such as reading resolution (in FIG. 4, 300×300 dpi) and a reading color mode (in FIG. 4, full color). An application function button 403 calls various advanced settings for reading and transmission. Here, the application functions include designation of magnification and a timer setting for reading, designation of a file name and report printing for transmission, and the like.

Figure 4B:
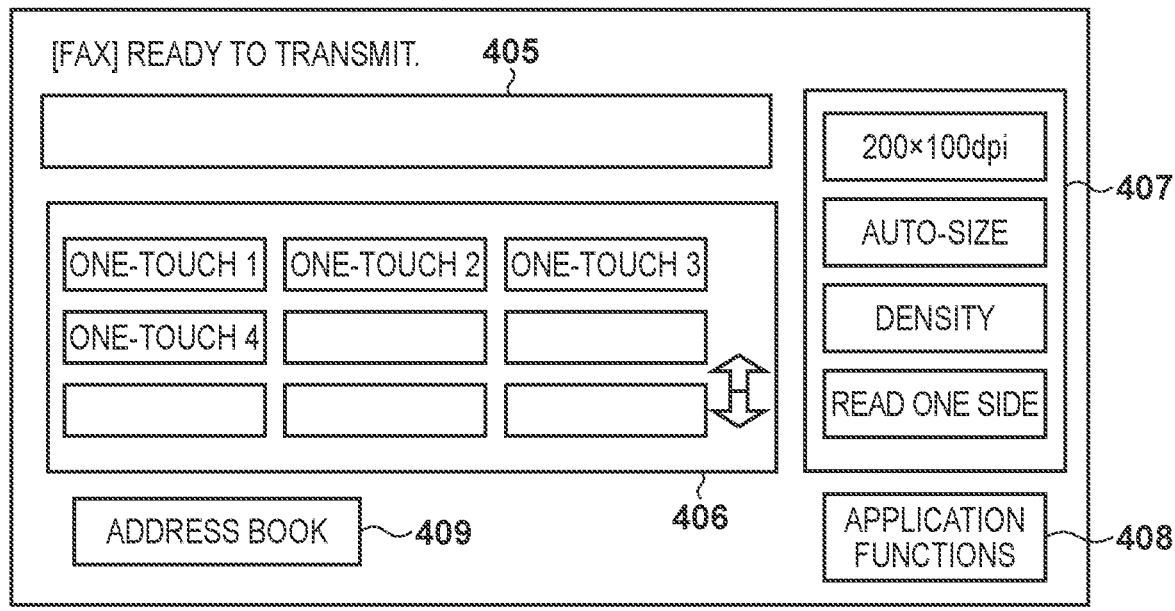
FIG. 4B is a diagram showing an exemplary fax operation screen.

FIG. 4B is a diagram showing an exemplary fax operation screen that is displayed on the display unit 301 of the operation unit 105 by the user pressing the "fax" button 308 on the screen in FIG. 3.

Here, as in the scan operation screen, a transmission setting button 407 and an application function button 408 are provided. An address of fax transmission is set by directly inputting a telephone number in a fax address input box 405 by using the ten key 302, or by selecting an address from among addresses displayed in a one-touch display area 406. Alternatively, the address can also be designated by pressing an address book button 409 to display the address book and selecting an address.

Figure 5A:
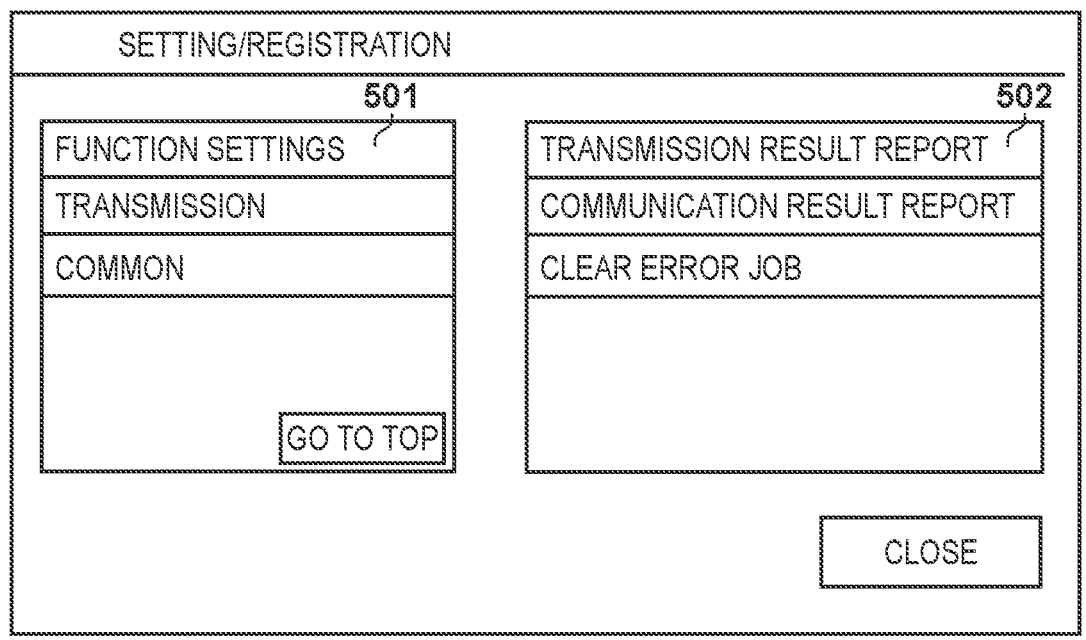
FIG. 5A is a diagram showing an exemplary device setting screen.

FIG. 5A is a diagram showing an exemplary device setting screen that is displayed on the display unit 301 of the operation unit 105 by the user pressing the setting/registration button 304 on the screen in FIG. 3.

A device setting menu has a hierarchical structure, and accordingly this screen is provided with a layer display area 501 for displaying the current layer and a setting item list 502 for displaying items that can be set in this layer. The user can display a setting screen for a desired item by selecting the item displayed in the setting item list 502. For example, if "transmission result report" is selected, a setting screen for setting the transmission result report printing operation can be opened.

Figure 5B:
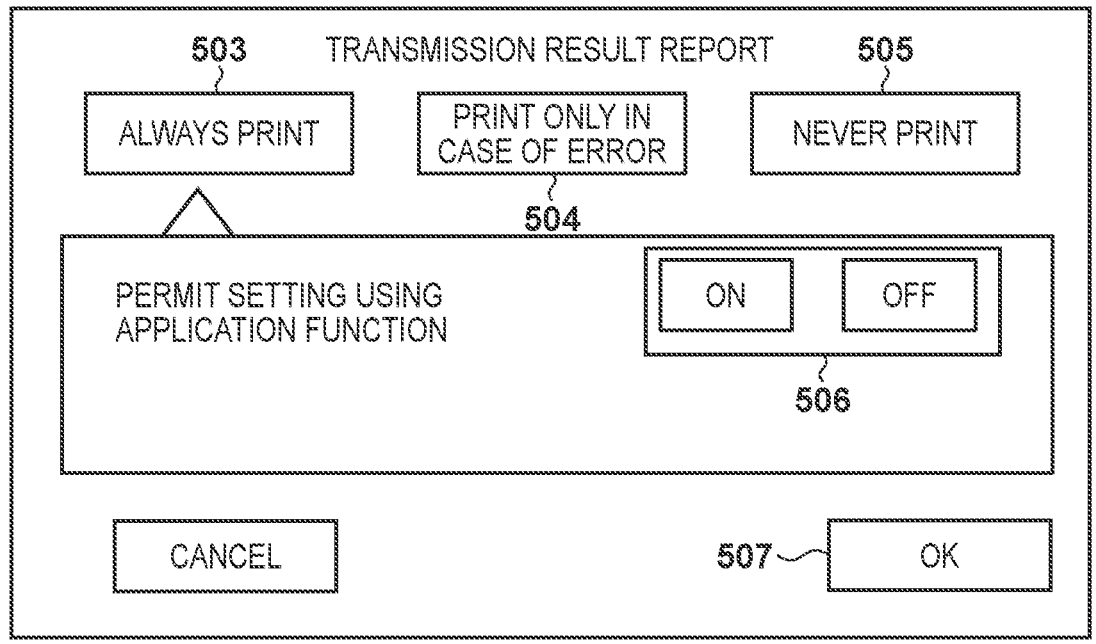
FIG. 5B is a diagram showing an exemplary transmission result report setting screen.

FIG. 5B is a diagram showing an exemplary transmission result report setting screen that is displayed by the user touching "transmission result report" in the setting item list 502 in FIG. 5A.

A device setting configured via this setting screen is effective for the device. Accordingly, the setting on this screen defines the transmission result report printing operation for all transmission jobs to be executed by this device.

An "always print" button 503 configures a setting so as to always print the transmission result report every time a transmission job ends. A "print only in case of error" button 504 configures a setting so as to print the transmission result report only when transmission ends due to an error. A "never print" button 505 configures a setting so as to never print the transmission result report. The user can set, on the device, the transmission result report printing operation after a transmission job ends, by selecting any of these buttons 503 to 505.

The transmission result report setting screen is also provided with a button 506 for permitting, when the user configures settings of a transmission job, an instruction from the application function in order to configure a setting of permitting or not permitting an instruction to print the transmission result report that is given through the application function button 403 or 408 in FIG. 4A or 4B, and an OK button 507 for fixing the setting on this screen.

The setting of, for example, printing or not printing the transmission result report that is thus configured via the screens in FIGS. 5A and 5B is registered as a device setting for this multi-function printer. Accordingly, this setting can be usually performed only by a user who has administrator authority.

Figure 6:
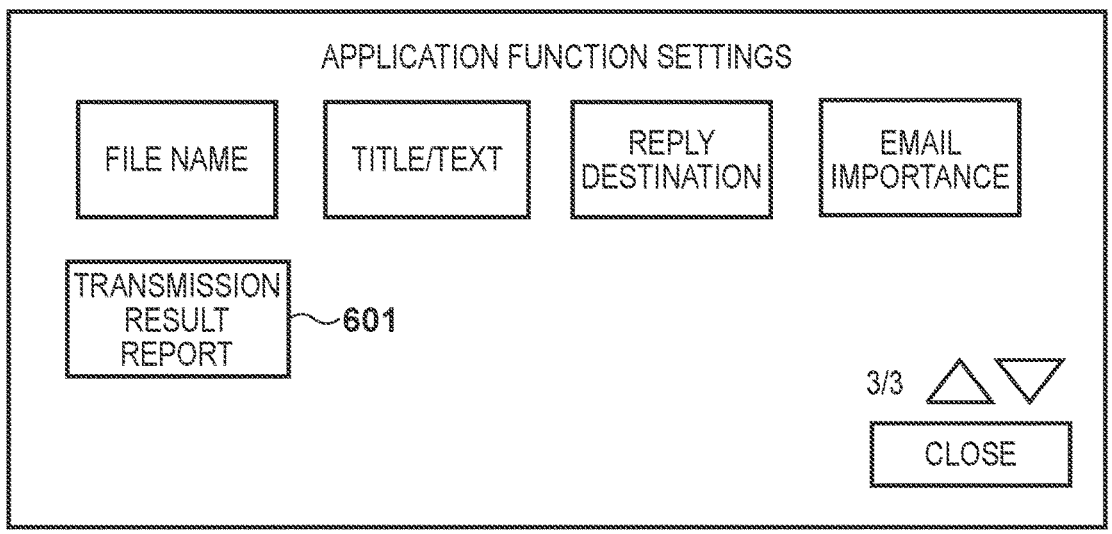
FIG. 6 is a diagram showing an exemplary application function setting screen that is displayed on the display unit by a user pressing an application function button in FIG. 4A or 4B.

On the other hand, the setting of printing or not printing the transmission result report via the screens in FIGS. 4A, 4B, and 6 is configured by the user for each job that is to be executed by the user, is configured in association with respective jobs, and can also be configured by a user who does not have the administrator authority.

FIG. 6 is a diagram showing an exemplary application function setting screen that is displayed on the display unit 301 by the user pressing the application function button 403 or 408 in FIG. 4A or 4B.

The setting using the application function is effective for each transmission job. The user can configure a necessary setting for a transmission job by pressing buttons displayed on this application function setting screen.

In FIG. 6, a "transmission result report" button 601 for giving an instruction to print the transmission result report is displayed on the third page of the application function setting screen, following buttons for setting "file name", "title/text", "reply address", and "email importance". The user can configure a setting so as to print the transmission result report after a transmission job ends, by touching this "transmission result report" button 601.

Figure 7:
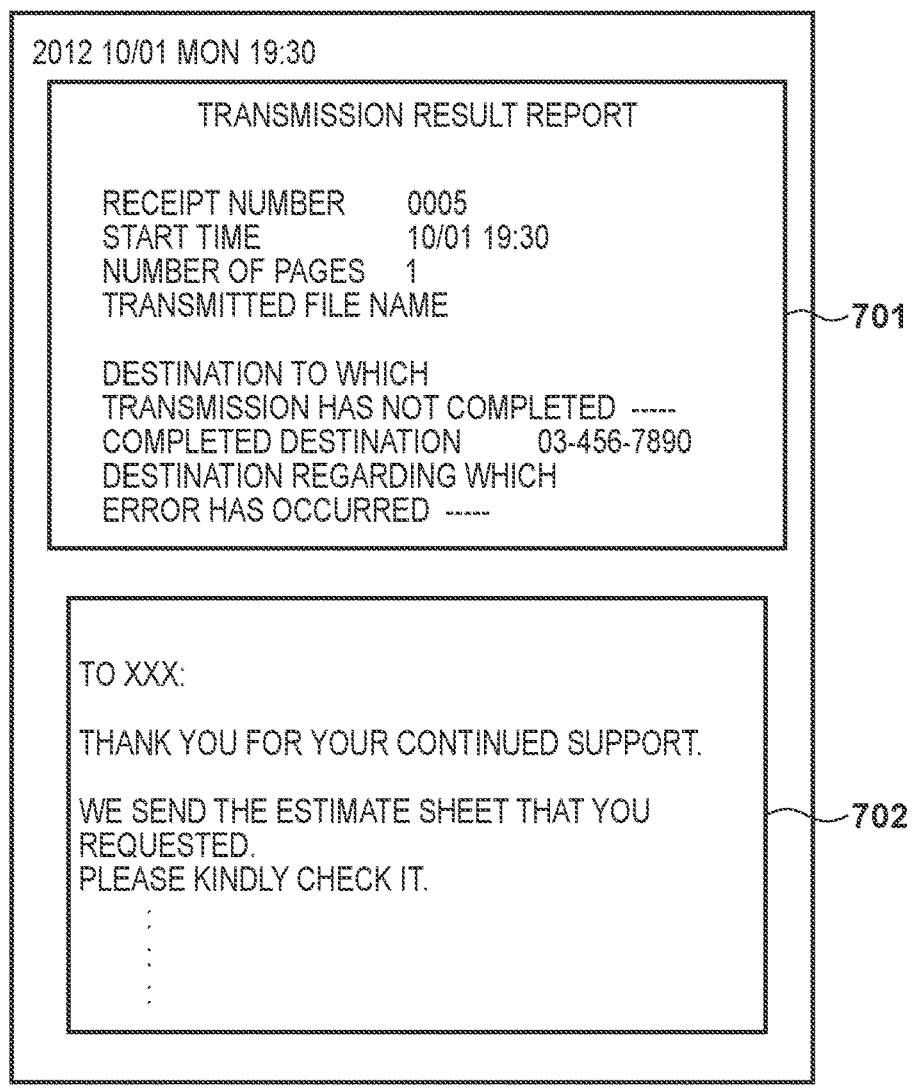
FIG. 7 is a diagram showing an exemplary transmission result report that is printed by the multi-function printer.

FIG. 7 is a diagram showing an exemplary transmission result report that is printed by the multi-function printer according to the embodiments.

The transmission result report includes a transmission result area 701 and a transmitted image area 702. In the transmission result area 701, the date and time when the report was output, the receipt number, transmission start time, and the number of transmitted sheets are printed. The telephone number of a transmission-completed address is printed as an address for which transmission has normally ended. If an error has occurred, the address of transmission regarding which the error has occurred is printed. In the transmitted image area 702, an image of the first page of transmitted sheets is printed.

Embodiment 1

Processing for setting an operation of printing the transmission result report on the device will be described below with reference to a flowchart in FIG. 8. Note that a control program related to this flowchart is stored in the memory 109, and the processing shown in the flowchart is realized by the program being executed under the control of the CPU 108.

Figure 8:
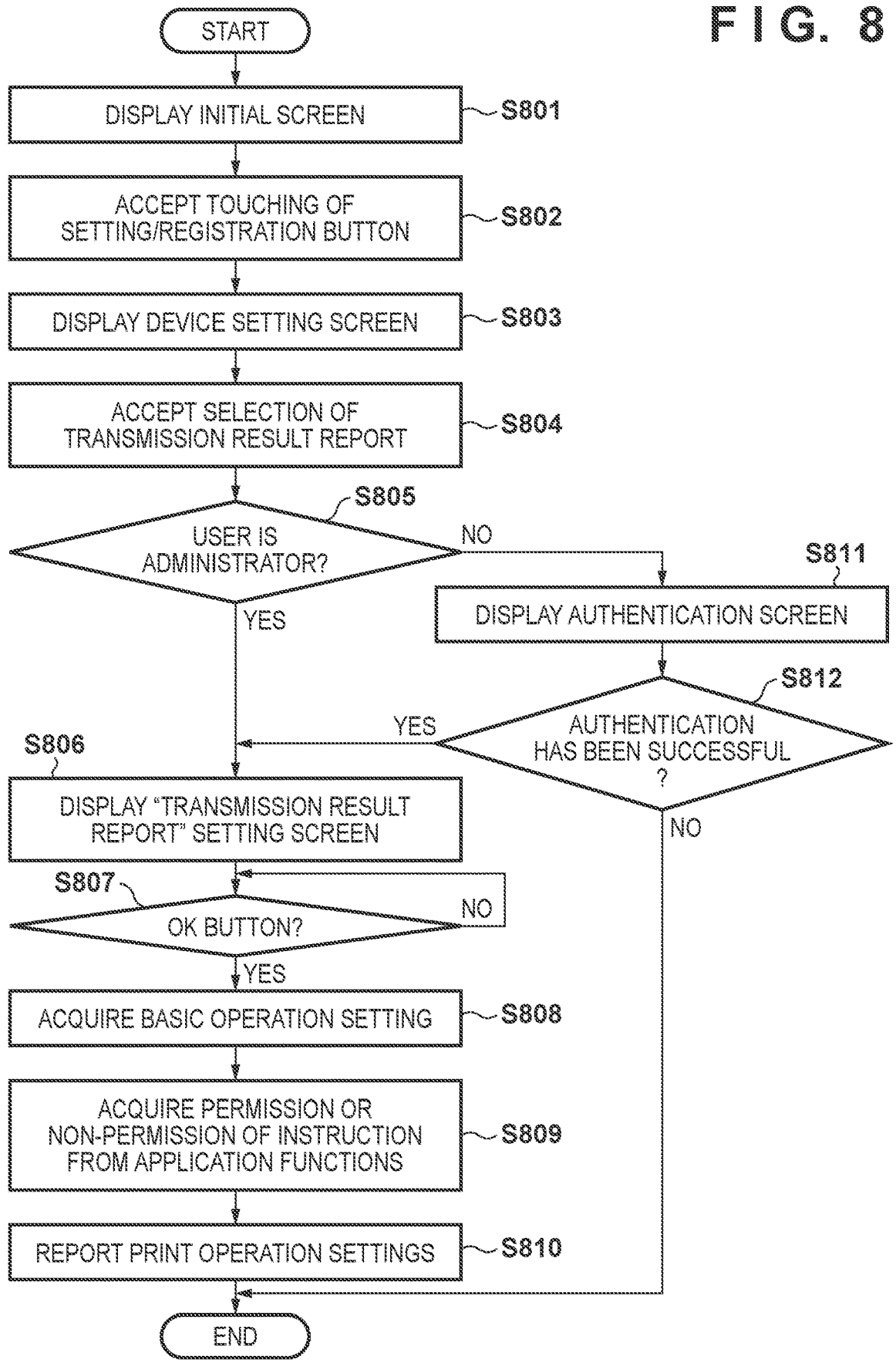
FIG. 8 is a flowchart illustrating a transmission result report print setting in the multi-function printer according to Embodiment 1.

FIG. 8 is a flowchart illustrating the transmission result report print setting in the multi-function printer according to Embodiment 1.

In step S801, the CPU 108 displays the initial screen shown in FIG. 3, on the display unit 301 of the operation unit 105. Next, upon the CPU 108 detecting in step S802 that the user has touched the setting/registration button 304 on the screen in FIG. 3, the CPU 108 proceeds to step S803 and displays the device setting screen shown in FIG. 5A, on the operation unit 105. Next, in step S804, as a result of the user selecting "transmission result report" in the setting item list 502, the CPU 108 accepts an instruction to display the transmission result report setting screen.

Next, the CPU 108 proceeds to step S805 and determines whether or not the operating user has the administrator authority. If the CPU 108 determines in step S805 that the user has the administrator authority, the CPU 108 proceeds to step S806 and displays the transmission result report setting screen shown in FIG. 5B, on the operation unit 105. In step S807, the CPU 108 waits for the OK button 507 being pressed on the screen in FIG. 5B. Upon the OK button 507 being pressed, the CPU 108 proceeds to step S808 and determines which of the "always print" button 503, the "print only in case of error" button 504, and the "never print" button 505 has been pressed (selected) on the screen in FIG. 5B. The CPU 108 then acquires the selected transmission result report setting as a basic operation setting. Next, the CPU 108 proceeds to step S809 and acquires which of ON and OFF in the button 506 for permitting the setting using the application function has been selected. The CPU 108 then proceeds to step S810, saves the transmission result report print settings acquired in steps S808 and S809 in the memory 109, and ends the processing.

On the other hand, if the user is not an administrator in step S805, the CPU 108 proceeds to step S811 and displays a user authentication screen on the operation unit 105. Then, in step S812, the CPU 108 determines whether or not user authentication has been successful based on user information that is input on this authentication screen. The CPU 108 proceeds to step S806 if the user authentication has been successful here, whereas the CPU 108 ends the processing if the user authentication has failed.

Note that, in Embodiment 1, the transmission result report print settings on the multi-function printer can be configured only by the administrator, and accordingly, when the user selects "transmission result report" in the setting item list 502 on the screen in FIG. 5A, it is determined whether or not this user has the administrator authority. However, a configuration may also be employed in which, if it is understood in advance that the user does not have the administrator authority, "transmission result report" in the setting item list 502 is shaded such that "transmission result report" cannot be selected when the device setting screen in FIG. 5A is displayed.

Subsequently, a description will be given, using a flowchart in FIG. 9, of processing for controlling display of the "transmission result report" button 601 that is displayed on the application function setting screen.

FIG. 9 is a flowchart illustrating processing in the case of configuring a print setting of "transmission result report" on the application function setting screen (FIG. 6) of the multi-function printer according to Embodiment 1. Note that a control program related to this flowchart is stored in the memory 109, and the processing shown in the flowchart is realized by the program being executed under the control of the CPU 108.

Initially, in step S901, the CPU 108 detects that the user has pressed the application function button 403 or 408 on the scan or fax operation screen in FIG. 4A or 4B, and accepts an instruction to display the application function setting screen. The CPU 108 then proceeds to step S902 and displays the application function setting screen shown in FIG. 6, for example. Next, the CPU 108 proceeds to step S903 and references the transmission result report print settings that are saved in the memory 109 in step S810 in FIG. 8. The CPU 108 then proceeds to step S904 and determines whether the setting using the application function has been permitted in the stored transmission result report print settings, i.e., whether ON in the button 506 on the screen in FIG. 5B has been pressed. If it is determined here that ON has been selected, i.e., that the print setting using the application function has been permitted, the CPU 108 proceeds to step S905, displays the "transmission result report" button 601 in an unshaded state on the screen in FIG. 6, and proceeds to step S906. In step S906, the CPU 108 acquires a state of pressing of the "transmission result report" button 601 on the screen in FIG. 6. The CPU 108 then proceeds to step S907, reflects the setting of printing or not printing the transmission result report in a set value of the job, in accordance with the pressing state, and ends the processing.

On the other hand, if it is determined in step S904 that the print setting using the application function has not been permitted, i.e., that OFF in the button 506 on the screen in FIG. 5B has been selected, the CPU 108 proceeds to step S908. In step S908, the CPU 108 displays the "transmission result report" button 601 in FIG. 6 in a shaded state, and ends the processing. Note that, since the transmission result report print setting is specifically described here, the processing ends after the "transmission result report" button 601 is displayed in a shaded state in step S908 in order not to accept the operation to the button 601. In practice, for example, a file name, a reply address, importance, and the like are set by other buttons being pressed in the example in FIG. 6.

With this processing, if, in step S906, the "transmission result report" button 601 has been pressed, a setting is configured so as to print the transmission result report for the transmission job. However, if the "transmission result report" button 601 is displayed in a shaded state, the user cannot operate this button 601, and accordingly a setting for printing the transmission result report cannot be configured with the application function buttons 403 and 408 in FIGS. 4A and 4B.

Subsequently, a description will be given, with reference to a flowchart in FIG. 10, of processing for controlling whether to print the transmission result report in accordance with the above-described settings, when a transmission job ends.

Figure 10:
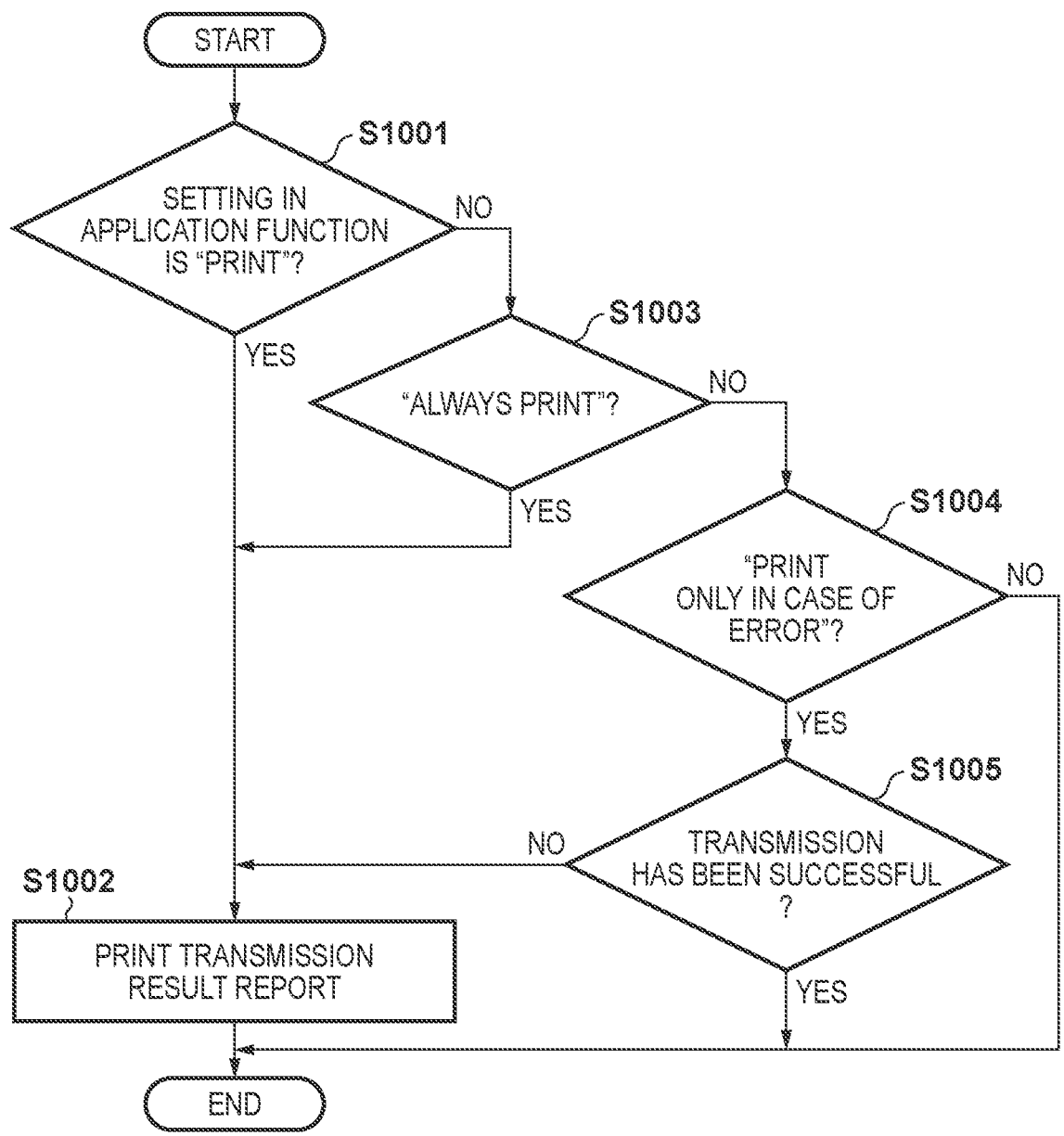
FIG. 10 is a flowchart illustrating processing for controlling, when transmission ends, whether to print the transmission result report in the multi-function printer according to Embodiment 1.

FIG. 10 is a flowchart illustrating processing for controlling, when transmission ends, whether to print the transmission result report in the multi-function printer according to Embodiment 1. Note that a control program related to this flowchart is stored in the memory 109, and the processing shown in the flowchart is realized by the program being executed under the control of the CPU 108.

This processing is started by a transmission job ending, and initially, in step S1001, the CPU 108 determines whether the printing of the transmission result report has been set for the transmission job that has ended, by using the "transmission result report" button 601 on the application function setting screen. If a setting has been configured here so as to print the transmission result report, the CPU 108 proceeds to step S1002, generates and prints the transmission result report, such as one shown in FIG. 7, and ends the processing. In Embodiment 1, in the case where the setting using the application function that is to be configured for each job has been permitted, if the printing of the transmission result report has been set by using the application function, this setting is given priority over the device setting, and the transmission result report is printed.

On the other hand, in step S1001, if the CPU 108 determines that the printing of the transmission result report has not been set by using the "transmission result report" button 601, the CPU 108 proceeds to step S1003. In step S1003, the CPU 108 references the transmission result report print settings that are saved in the memory 109, and determines whether the setting on the device is "always print". Here, if the CPU 108 determines that the setting is "always print", the CPU 108 proceeds to step S1002, prints the transmission result report, and ends the processing.

On the other hand, if the CPU 108 determines in step S1003 that the setting is not "always print", the CPU 108 proceeds to step S1004 and determines whether or not the setting on the device is "print only in case of error". If so, the CPU 108 proceeds to step S1005, references information of the job for which transmission has ended, and determines whether or not the transmission of the job has been successful. Here, if the CPU 108 determines that the transmission has failed, the CPU 108 proceeds to step S1002 and prints the transmission result report, whereas if the transmission has been successful, the CPU 108 ends the processing without printing the transmission result report. If the CPU 108 determines in step S1004 that the setting on the device is not "print only in case of error", the CPU 108 determines that the setting on the device is "never print", and ends the processing without printing the transmission result report.

As described above, according to Embodiment 1, the setting of printing or not printing the transmission result report can be configured on both the setting screen for configuring settings on the device and the setting screen for configuring settings for each job. Furthermore, whether or not to permit the settings to be configured on the setting screen for each job can be designated in the settings on the device, and accordingly a configuration is also possible in which, if, for example, the administrator configures a setting on the multi-function printer so as to print the transmission result report, the user cannot change this setting for each job.

Embodiment 2

In Embodiment 1 described above, a setting of printing the transmission result report can be configured on the application function screen that can also be operated by a general user, but a setting of not printing the transmission result report cannot be configured. However, if the administrator does not set "always print", there may possibly be no problem in the management even if a general user can designate whether or not it is necessary to print the transmission result report.

In Embodiment 2, when the administrator sets "always print" on the multi-function printer, a transmission result report print setting configured by a general user is not accepted. Also, in the example described below, when the administrator does not set "always print", a transmission result report print setting configured by a general user is accepted. Note that, since the configuration and the like of the multi-function printer according to Embodiment 2 are similar to those in Embodiment 1 described above, a description thereof will be omitted.

Figure 11:
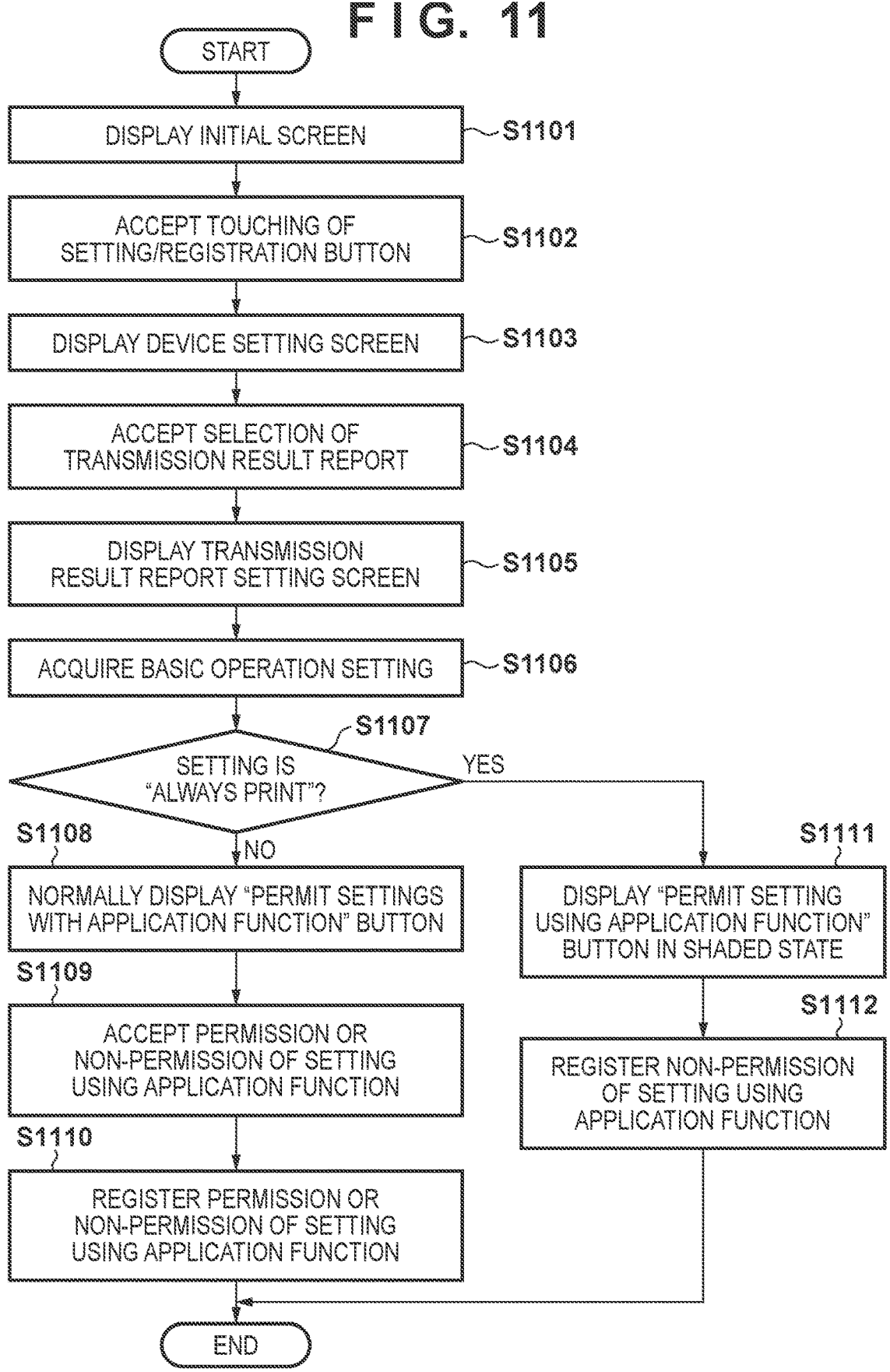
FIG. 11 is a flowchart illustrating a transmission result report print setting in a multi-function printer according to Embodiment 2.

FIG. 11 is a flowchart illustrating a transmission result report print setting in the multi-function printer according to Embodiment 2. In FIG. 11, processing in steps S1101 to S1106 is the same as the operations in steps S801 to S804, S806, and S808 in FIG. 8 described above, and accordingly a description thereof will be omitted. Note that a control program related to this flowchart is stored in the memory 109, and the processing shown in the flowchart is realized by the program being executed under the control of the CPU 108. Note that, although the processing for displaying the transmission result report setting screen including the user authentication processing has been described in FIG. 8 in Embodiment 1 above, a description of the authentication processing will be omitted here.

In step S1107, the CPU 108 determines whether "always print" has been selected on the transmission result report setting screen in FIG. 5B. If it is determined here that "always print" has been selected, the CPU 108 proceeds to step S1111, displays the "permit setting using application function" button 506 in a shaded state on the screen in FIG. 5B so as not to allow the setting using the application function. The CPU 108 then proceeds to step S1112, registers that the setting using the application function is not allowed, and ends the processing.

On the other hand, if the CPU 108 determines in step S1107 that "always print" has not been selected on the transmission result report setting screen in FIG. 5B, the CPU 108 proceeds to step S1108 and displays the "permit setting using application function" button 506 in a normal state on the screen in FIG. 5B. The CPU 108 then proceeds to step S1109, accepts selection of ON or OFF in the "permit setting using application function" button 506 on the screen in FIG. 5B, and upon the OK button 507 being pressed, in step S1110, the CPU 108 registers this setting and ends the processing.

Next, processing for printing the transmission result report after transmission ends will be described with reference to a flowchart in FIG. 12.

Figure 12:
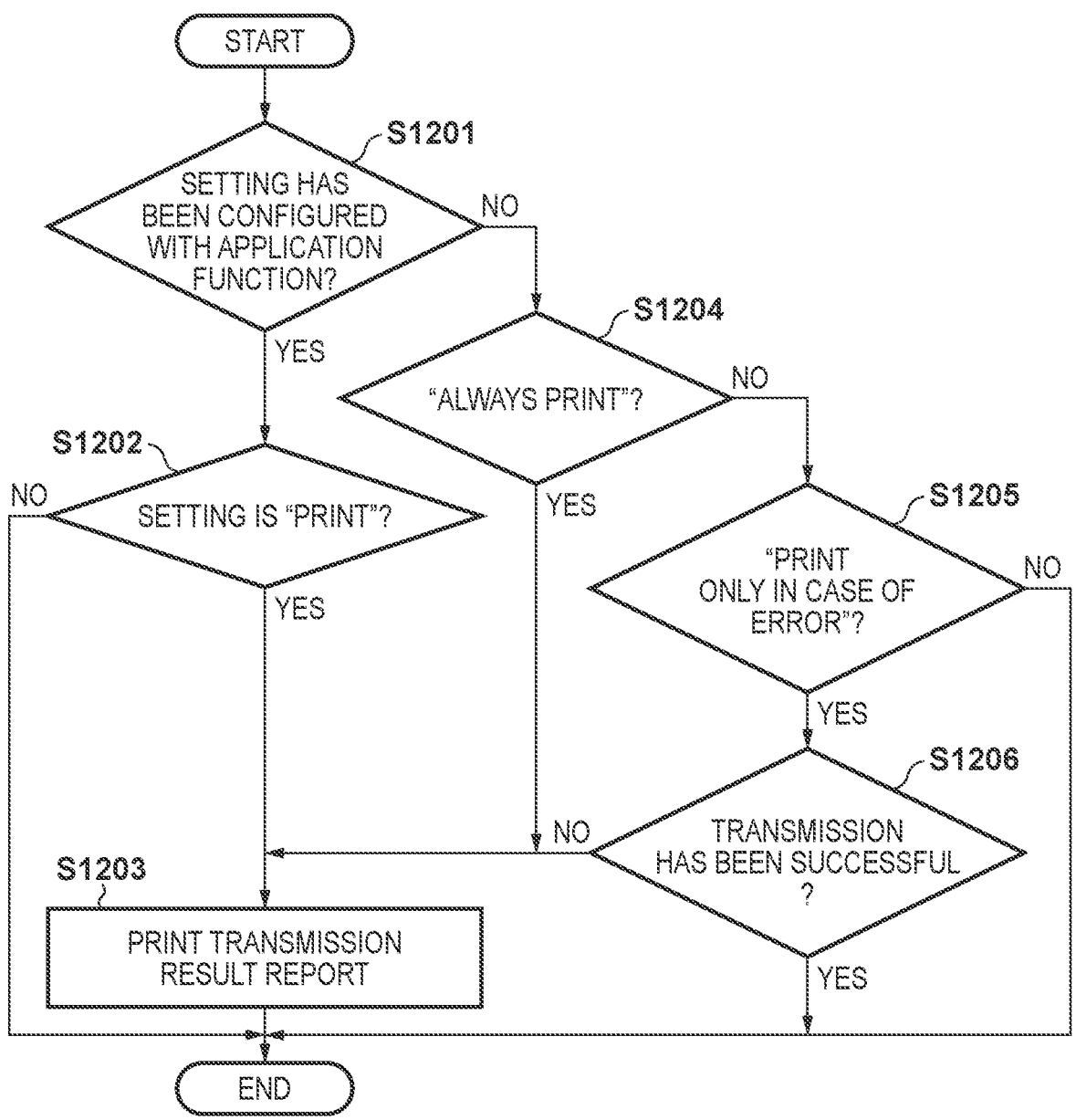
FIG. 12 is a flowchart illustrating processing for controlling, when transmission ends, whether to print the transmission result report in the multi-function printer according to Embodiment 2.

FIG. 12 is a flowchart illustrating processing for controlling, when transmission ends, whether to print the transmission result report in the multi-function printer according to Embodiment 2. Note that a control program related to this flowchart is stored in the memory 109, and the processing shown in the flowchart is realized by the program being executed under the control of the CPU 108.

In step S1201, the CPU 108 determines whether the printing of "transmission result report" has been set using the application function for the transmission job submitted by the user. If it is determined that the printing has been set, the CPU 108 proceeds to step S1202 and determines whether or not this setting is a print instruction that is given by the "transmission result report" button 601 being pressed on the screen in FIG. 6. If it is determined in step S1202 that the setting is "print", the CPU 108 proceeds to step S1203, references information of the transmission job, generates and prints the transmission result report such as one shown in FIG. 7, and ends the processing. On the other hand, if the setting is not "print" in step S1202, the CPU 108 ends the processing without printing the transmission result report.

If the CPU 108 determines in step S1201 that the setting using the application function has not been configured, the CPU 108 proceeds to step S1204, references the transmission result report print settings that are saved in the memory 109, and determines whether the setting on the device is "always print". Here, if the CPU 108 determines that the setting is "always print", the CPU 108 proceeds to step S1203, prints the transmission result report, and ends the processing.

On the other hand, if the CPU 108 determines in step S1204 that the setting is not "always print", the CPU 108 proceeds to step S1205 and determines whether the setting on the device is "print only in case of error". If so, the CPU 108 proceeds to step S1206, references information of the job for which transmission has ended, and determines whether or not the transmission of the job has been successful. Here, if the CPU 108 determines that the transmission has failed, the CPU 108 proceeds to step S1203 and prints the transmission result report, whereas if the transmission has been successful, the CPU 108 ends the processing without printing the transmission result report. If the CPU 108 determines in step S1205 that the setting on the device is not "print only in case of error", the CPU 108 determines that the setting on the device is "never print", and ends the processing without printing the transmission result report.

As described above, according to Embodiment 2, a configuration is possible in which the printing of the transmission result report is not executed if a setting is not configured so as to print "transmission result report" on the screen of the application functions that can also be operated by a general user.

Embodiment 3

In the transmission result report shown in FIG. 7, an image of the first page of a transmitted original is printed together with a transmission result. However, it is conceivable, in terms of print costs or the like, to enable a setting of printing or not printing the transmitted image on the transmission result report to be configured.

However, there is a demand for printing the image of a transmission result together as evidence of having transmitted an important document, when printing the transmission result report. At this time, operability degrades if the setting of printing or not printing the transmitted image on the transmission result report is switched for each transmission job and this setting is again restored to the original state after transmission ends.

Embodiment 3 will describe an example of configuring the setting of printing or not printing an image of a transmission result together when printing the transmission result report. Note that, since the configuration and the like of the multi-function printer according to Embodiment 3 are similar to those in Embodiment 1 described above, a description thereof will be omitted.

Figure 13:
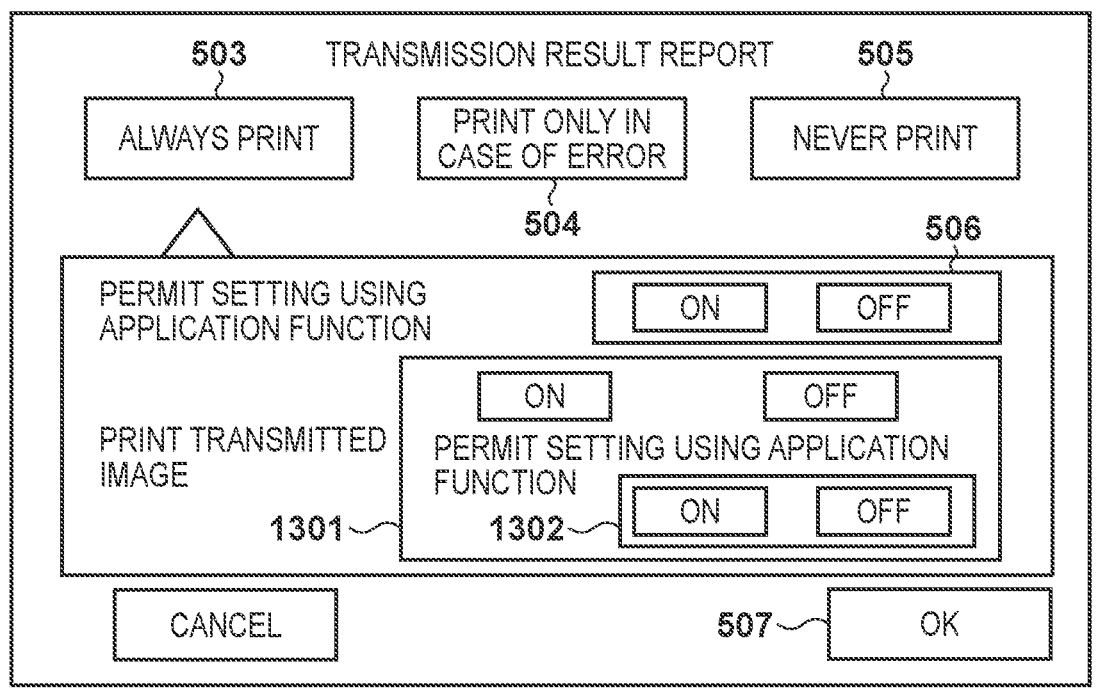
FIG. 13 is a diagram showing an exemplary transmission result report print setting screen that is displayed in a multi-function printer according to Embodiment 3.

FIG. 13 is a diagram showing an exemplary transmission result report print setting screen that is displayed in a multi-function printer according to Embodiment 3. This transmission result report print setting screen is called and displayed as a result of the user selecting "transmission result report" in the setting item list 502 on the screen in FIG. 5A.

Here, as compared with the screen in FIG. 5B according to Embodiment 1 described above, a button 1301 for configuring a setting of printing or not printing a transmitted image is provided in addition to the button 506 for designating whether to permit an instruction to print the transmission result report. The button 1301 is a transmitted image setting button for configuring a setting of printing or not printing the transmitted image on the transmission result report. A button 1302 is a button for configuring a setting using the application function, the button enabling a setting of printing or not printing the transmitted image to be configured for each job using the application function. With any of these buttons, if ON is selected, a setting is configured so as to execute the function, and if OFF is selected, a setting is configured so as not to execute the function.

Figure 14:
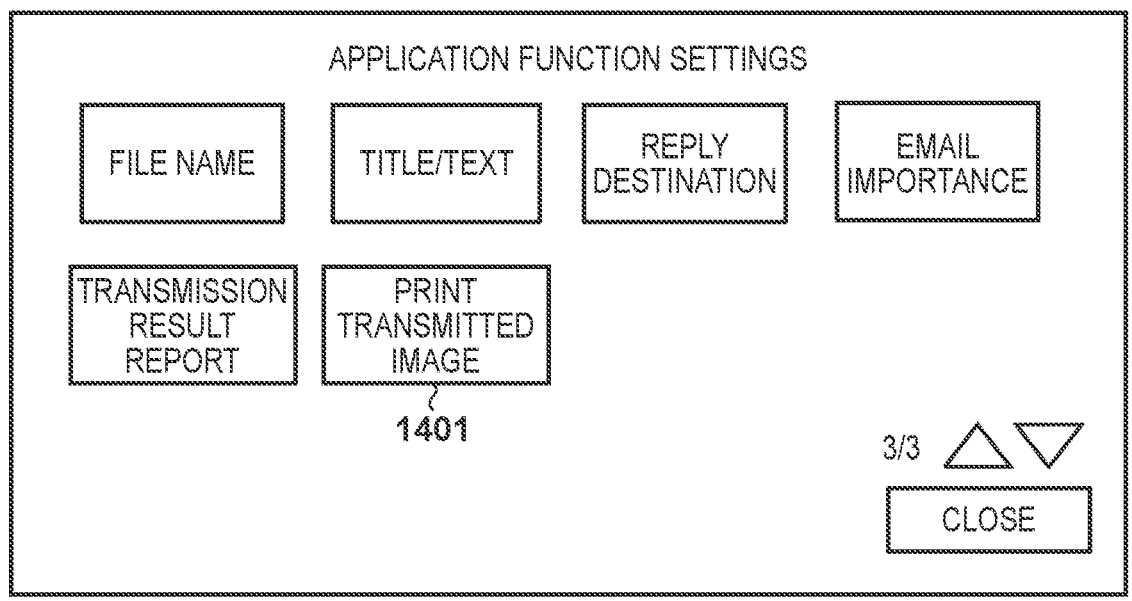
FIG. 14 is a diagram showing an exemplary application function setting screen that is displayed on a display unit 301 by a user pressing an application function button 403 or 408 in FIG. 4A or 4B, in Embodiment 3.

FIG. 14 is a diagram showing an exemplary application function setting screen that is displayed on the display unit 301 by the user pressing the application function button 403 or 408 in FIG. 4A or 4B, in Embodiment 3.

As is clear as compared with FIG. 6, a "print transmitted image" button 1401 is added in FIG. 14. The user can configure a setting so as to print the transmitted image on the transmission result report that is printed after the transmission job ends, by pressing this button 1401.

This "print transmitted image" button 1401 is displayed in a shaded state when OFF is selected in the button 1302 for permitting the setting using the application function on the screen in FIG. 13. On the other hand, when ON is selected in the button 1302 for permitting the setting using the application function on the screen in FIG. 13, the "print transmitted image" button 1401 is normally displayed and is selectable.

Subsequently, processing for printing the transmission result report when transmission ends will be described using a flowchart in FIG. 15.

Figure 15:
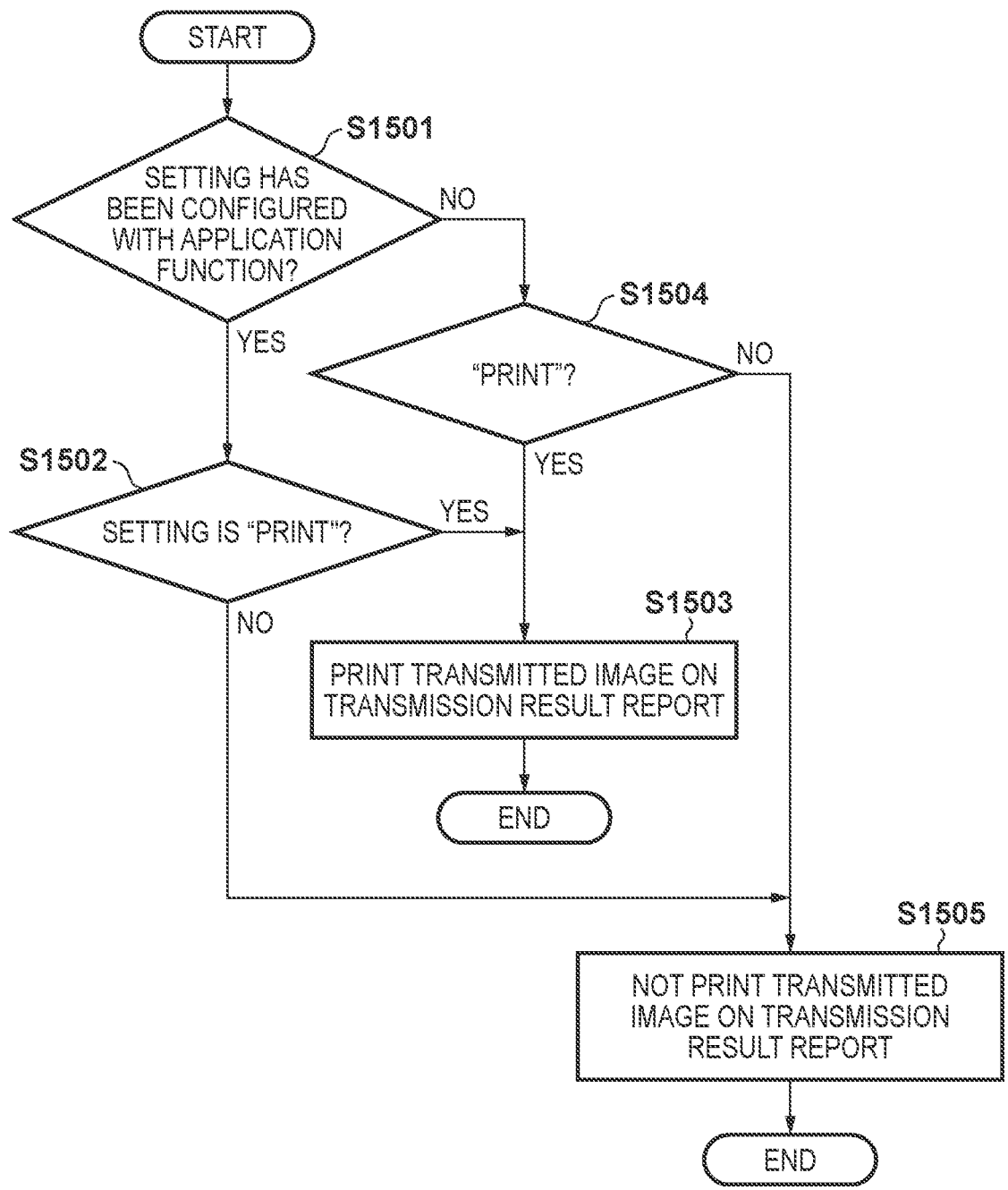
FIG. 15 is a flowchart illustrating processing for controlling, when transmission ends, whether to print the transmission result report in the multi-function printer according to Embodiment 3.

FIG. 15 is a flowchart illustrating processing for controlling, when transmission ends, whether to print the transmission result report in the multi-function printer according to Embodiment 3. Note that a control program related to this flowchart is stored in the memory 109, and the processing shown in the flowchart is realized by the program being executed under the control of the CPU 108.

Above Embodiments 1 and 2 have described the operation of printing the transmission result report itself with the settings on the device and the user settings, whereas the description here will focus on the printing of the transmitted image at the time of printing the transmission result report.

This processing is started by a transmission job ending, and initially, in step S1501, the CPU 108 determines whether or not "print transmitted image" has been set in the setting of the application function for the ended transmitted job. If it is determined in step S1501 that "print transmitted image" has been set, the CPU 108 proceeds to step S1502 and determines whether or not this setting is "print". Here, if the setting is "print", the CPU 108 proceeds to step S1503, references information of the transmission job that has ended and image information thereof, and generates and prints the transmission result report using the image of the first page of the transmitted image. That is to say, the CPU 108 prints the image of the first page of the transmitted original in the transmitted image area 702 in FIG. 7, and ends the processing. On the other hand, if the CPU 108 determines in step S1502 that the setting is not "print", the CPU 108 proceeds to step S1505. In step S1505, the CPU 108 references the information of the transmitted job, and generates and prints the transmission result report that does not contain the transmitted image. That is to say, the CPU 108 prints the report in which nothing is printed in the transmitted image area 702 in FIG. 7, and ends the processing.

On the other hand, if, in step S1501, "print transmitted image" has not been set in the setting of the application function, the CPU 108 proceeds to step S1504 and follows the settings on the device regarding whether or not to print the transmitted image. Here, the CPU 108 references the transmitted image print setting that is saved in the memory 109, and determines whether or not the setting on the device is "print". If the CPU 108 determines in step S1504 that the setting is "print", the CPU 108 proceeds to step S1503, prints the transmission result report with the transmitted image, and ends the processing. On the other hand, if the CPU 108 determines in step S1504 that the printing of the transmitted image has not been set, the CPU 108 proceeds to step S1505, prints the transmission result report that does not contain the transmitted image, and ends the processing.

As described above, according to Embodiment 3, whether to print the transmitted image on the transmission result report can be controlled with the settings for each job configured by the user.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-062727, filed Mar. 25, 2014, which is hereby incorporated by reference wherein in its entirety.

What is claimed is:

1. A transmitting apparatus comprising:
a communication interface that transmits data according to a transmission job; and
a controller having one or more processors which executes instructions stored in one or more memories, the controller being configured to:
set a first setting of outputting of a transmission report indicating a transmission result of the transmission job as a setting of the transmission job; and
set a second setting of outputting of the transmission report indicating the transmission result of the transmission job and set a third setting for setting whether or not it is possible to set the first setting as a device setting of the apparatus,
wherein, in a case where the third setting is set so it is not possible to set the first setting in the device setting, the controller is not able to set the first setting, and
wherein, in a case where the third setting is set so it is possible to set the first setting in the device setting, the controller is able to set the first setting.

2. The transmission apparatus according to claim 1, wherein the controller is able to set the first setting of outputting of the transmission report of the transmission job as the setting of the transmission job in accordance with having set to accept the second setting of outputting of the transmission report of the transmission job as the device setting of the apparatus in a case the third setting is set so it is possible to set the first setting in the device setting, and the controller is able to set the first setting.

3. The transmission apparatus according to claim 1, wherein the controller is not able to set the first setting of outputting of the transmission report of the transmission job as the setting of the transmission job in accordance with having set not to accept the second setting of outputting of the transmission report of the transmission job as the device setting of the apparatus.

4. The transmission apparatus according to claim 1, further comprising:
a scanner that reads an original to generate image data,
wherein the controller is able to set to a setting of outputting of image data generated by the scanner on the transmission report as the device setting of the apparatus.

5. The transmission apparatus according to claim 4, wherein the controller is further able to set a setting of outputting of image data on the transmission report as the setting of the transmission job, and
wherein the controller is further able to set whether or not to accept the second setting of outputting of the image data on the transmission report of the transmission job of the setting of the transmission job as the device setting of the apparatus.

6. The transmission apparatus according to claim 5, wherein the controller is able to set the setting of outputting of the image data on the transmission report as the setting of the transmission job in accordance with having set to accept the setting of outputting of the image data on the transmission report of the transmission job of the setting of the transmission job as the device setting of the apparatus.

7. The transmission apparatus according to claim 5, wherein the controller is not able to set the setting of outputting of the image data on the transmission report as the setting of the transmission job in accordance with having set not to accept the setting of outputting of the image data on the transmission report of the transmission job of the setting of the transmission job as the device setting of the apparatus.

8. The transmission apparatus according to claim 1, wherein the data is transmitted via electronic mail.

9. The transmission apparatus according to claim 1, wherein the device setting is able to be set by a user having an administrator authority.

10. The transmission apparatus according to claim 1, wherein the first setting of outputting of the transmission job is able to be set by a user having an administrator authority and a user having no administrator authority.

11. The transmission apparatus according to claim 1, further comprising:
a printer that prints the transmission report,
wherein the outputting of the transmission report is executed by the printer.

12. The transmission apparatus according to claim 5, wherein a first item for setting the third setting, a second item for setting of outputting the image data on the transmission report as the device setting, and a third item for enabling or not to set a setting of outputting the image data on the transmission report for each transmission job are displayed on one screen.

13. A method of controlling a transmitting apparatus having a communication interface that transmits data according to a transmission job, the method comprising:
- setting a first setting of outputting of a transmission report indicating a transmission result of the transmission job as a setting the transmission job; and
- setting a second setting of outputting of the transmission report indicating the transmission result of the transmission job and setting a third setting for setting whether or not it is possible to set the first setting as a device setting of the apparatus,
- wherein, in a case where the third setting is set so it is not possible to set the first setting in the device setting, the first setting is not able to be set, and
- wherein, in a case where the third setting is set so it is possible to set the first setting in the device setting, the first setting is able to be set.

* * * * *